United States Patent

Chadha et al.

[15] 3,664,997

[45] May 23, 1972

[54] ROOM TEMPERATURE CURING ORGANOPOLYSILOXANE ELASTOMERS

[72] Inventors: Rajendra Nath Chadha; Kailash Chandra Pande, both of Farmingdale, N.Y.

[73] Assignee: Stauffer-Wacker Silicone Corporation, Adrian, Mich.

[22] Filed: Mar. 9, 1970

[21] Appl. No.: 17,983

Related U.S. Application Data

[63] Continuation-in-part of Ser. No. 676,090, Oct. 18, 1967, abandoned.

[52] U.S. Cl. ............... 260/18 S, 260/33.2 SB, 260/33.6 SB, 260/33.8 SB, 260/37 SB, 260/46.5 E, 260/46.5 G, 260/825
[51] Int. Cl. ............................................. C08h 9/00
[58] Field of Search ............... 260/46.5 G, 46.5 E, 18 S, 825

[56] References Cited

UNITED STATES PATENTS

| | | | |
|---|---|---|---|
| 3,436,252 | 4/1969 | Neuroth | 117/155 |
| 3,471,434 | 10/1969 | Pande et al. | 260/37 |
| 3,065,194 | 11/1962 | Nitzsche et al. | 260/37 |
| 3,524,900 | 8/1970 | Gibbon | 260/825 |
| 3,531,424 | 9/1970 | Swanson | 260/18 |
| 3,555,109 | 1/1971 | Getson | 260/825 |
| 3,565,851 | 2/1971 | Neuroth | 260/37 |

*Primary Examiner*—Donald E. Czaja
*Assistant Examiner*—M. I. Marquis
*Attorney*—Marion D. Ford

[57] ABSTRACT

The invention relates to curable room temperature organopolysiloxanes comprising an organopolysiloxane and an organotin compound of the formula

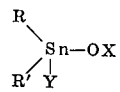

wherein X is a group represented by hydrogen or

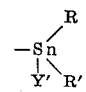

in which R and R' are hydrocarbon groups, Y and Y' are groups represented by hydrocarbon, hydroxyl, halogen, OOCR" or OR and R" is a hydrocarbon group.

8 Claims, No Drawings

ROOM TEMPERATURE CURING ORGANOPOLYSILOXANE ELASTOMERS

This application is a continuation-in-part of the applicants' copending application Ser. No. 676,090, filed Oct. 18, 1967 now abandoned.

This invention relates to a new curing system, particularly to a system for curing organopolysiloxanes and more particularly to a curing system which utilizes organotin compounds in the formation of organopolysiloxane elastomers at room temperature.

Heretofore, organopolysiloxanes have been cured with organotin catalysts such as dibutyltin butoxychloride, dibutyltin dilaurate and the like. However, it was found that these catalysts do not provide a desirable rate of cure. Consequently, slow curing one and two-component systems were undesirable in some commercial applications due to their slow curing rate. Obviously, there has been a need in the prior art for organopolysiloxane compositions which are capable of rapid curing and are particularly adapted for commercial use.

It is therefore an object of this invention to provide an improved curing system for silicone elastomers. Another object of this invention is to provide a new curing system for silicone elastomers. Still another object of this invention is to provide a curing system which is operative at room temperature. A further object of this invention is to provide an improved curing catalyst for slow curing one-component and two-component systems. A still further object of this invention is to provide an improved system for accelerating the curing rate of organopolysiloxanes.

The foregoing objects and others which will become apparent from the following description are accomplished in accordance with this invention, generally speaking, by incorporating in an organopolysiloxane composition a curing catalyst represented by the formula

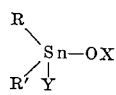

wherein X is a group represented by hydrogen or

in which R and R', which may be the same or different, are hydrocarbon groups having up to 18 carbon atoms, e.g., alkyl, aryl, alkaryl, alkenyl or halo-substituted hydrocarbon groups, Y and Y', which may be the same or different, represent hydrocarbon groups having up to 18 carbon atoms, hydroxyl, halogen, OOCR'' or OR in which R'' is a hydrocarbon group having from one to 18 carbon atoms.

Examples of compounds embraced by the above formula are bis(acetoxybutylphenyltin)oxide, bis(acetoxydibutyltin)oxide, bis(butyldiethyltin)oxide, bis(butyldimethyltin)oxide, bis(diamylethyltin)oxide, bis[dibutyl(dodecyloxy)tin]oxide, bis[dibutyl(hexyloxy)tin]oxide, bis(diethylhexyltin)oxide, bis(diethyloctyltin)oxide, bis(dimethyloctyltin)oxide, bis(dodecyldiethyltin)oxide, bis(dodecyldimethyltin)oxide, bis(triamyltin)oxide, bis(tribenzyltin)oxide, bis(tributyltin)oxide, bis[tris(o-bromobenzyl)tin]oxide, bis[tris(p-fluorophenyl)tin]oxide, bis[(allyloxy)dibutyltin]oxide, bis[(benzyloxy)dibutyltin]oxide, bis[(benzyloxy)diethyltin]oxide, bis(dibutyllauratotin)oxide, bis(dioctyllauratotin)oxide, benzylbutylphenyltin hydroxide, benzylphenyl-p-tolyltin hydroxide, di-tert-butylbromotin hydroxide, di-tert-butylchlorotin hydroxide, diphenylchlorotin hydroxide, ethyldimethyltin hydroxide, tributyltin hydroxide, tri-tert-butyltin hydroxide, triethyltin hydroxide, tris(p-bromophenyl)tin hydroxide, tris(p-chlorophenyl)tin hydroxide, tri-o-tolyltin hydroxide, dibutyllauratotin hydroxide, dibutylacetotin hydroxide, diphenylbutoxytin hydroxide, dibutylmethoxytin hydroxide, diphenylmethacrylatotin hydroxide and the like.

Generally, compounds having the formula $R_3SnOH$ wherein R is an organic group are prepared by mixing an ether solution of an organotin halide with an aqueous solution of potassium, sodium or ammonium hydroxide. The ether may be omitted in large scale preparation if the organotin halide is a liquid or lower melting solid, but heating is generally required.

Other organotin compounds such as $(R_3Sn)_2O$ may be prepared from the corresponding hydroxides by removing a molecule of water. This may be accomplished, in most cases, by distilling the organotin hydroxide under reduced pressure or by heating under reduced pressure in a vacuum desiccator using calcium chloride or phosphorus pentoxide as a drying agent. The bis-oxides that are not easily hydrolyzed, may be prepared by reacting an appropriate organotin halide with an aqueous alkali.

Other organotin compounds such as $R_3SnOR$ or $R_2Sn(OR)_2$ may be prepared by treating an organotin halide with a sodium alkoxide or phenoxide or by reacting an organotin hydroxide, halide, ester or oxide with an alcohol or phenol. Frequently, an organotin oxide is reacted with an alcohol in the presence of benzene or toluene and the water removed by azeotropic distillation.

The organotin esters of the formula $R_3SnOCOR$ or $R_2Sn(OCOR)_2$ may be prepared by conventional techniques such as by reacting organotin hydroxide, oxides or halides with organic acid or acid anhydrides. As mentioned previously, these catalysts may be incorporated in slow curing one-component systems of the formula

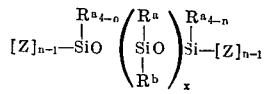

wherein $R^a$ and $R^b$ which may be the same or different are monovalent hydrocarbon radicals, halogenated monovalent hydrocarbon radicals or cyanoalkyl radicals, Z is a radical hydrolyzable by ambient moisture; $n$ is an integer of from 2 to 4 and $x$ is an integer of from 1 to 20,000.

In the above formula $R^a$ and $R^b$ are organic radicals selected from the class consisting of alkyl radicals having from one to 18 carbon atoms such as methyl, ethyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like. Examples of hydrolyzable groups represented by Z are monoacyloxy radicals of carboxylic acids such as acetoxy, propionyloxy, valeryloxy, caproyloxy, myristoyloxy and stearoyloxy radicals; hydrocarbonoxy groups having from one to 10 carbon atoms such as methoxy, ethoxy, butoxy, heptoxy, octoxy, decoxy, phenoxy and the like; aminooxy groups such as dimethylaminooxy, diethylaminooxy, dipropylaminooxy, dibutylaminooxy, dioctylaminooxy, diphenylaminooxy, ethylmethylaminooxy, methylphenylaminooxy and the like; oximo radicals such as acetophenoximo, acetonoximo, benzophenoximo, 2-butanoximo, diisopropylketonoximo, chlorocyclohexanoximo, alpha-bromoacetophenoximo and the like.

Organopolysiloxanes containing acyloxy groups may be prepared by reacting hydroxyl-terminated organopolysiloxanes with acyloxysilanes of the formula $R^a_{4-n}Si(Ac)_n$, wherein $R^a$ and $n$ are the same as those represented above and Ac is an acyloxy group, at a ration of at least 1 mole of acyloxysilane per mole of silicon bonded hydroxyl group at a temperature ranging from about 20° C. to about 100° C. Higher or lower temperatures may be used, if desired, although it is preferred that the reaction be carried out at temperatures below about 200° C.

Where the hydrolyzable groups on the organopolysiloxanes are aldo- or keto-oximo groups, they may be prepared by reacting hydroxyl-terminated organopolysiloxane fluids of suitable viscosity with the product obtained from the reaction of an organotrihalosilane and an aldo- or keto-oxime.

These organopolysiloxanes containing hydrolyzable groups may be cured by merely exposing them to moisture in the atmosphere or in the presence of additional water vapor at room temperature. Upon exposure to moisture, cross-linking of the composition occurs at times varying from a few minutes up to about one hour depending upon the type of hydrolyzable group and the type of tin catalyst used.

In the two-component system, these catalysts are incorporated in a composition comprising an organopolysiloxane having functional groups, most of which are attached to the terminal silicon atoms and a cross-linking agent. The organopolysiloxane, preferably hydroxyl-terminated organopolysiloxane, may be represented by the formula

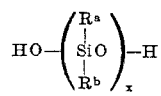

wherein $R^a$, $R^b$ and $x$ are the same as those represented above.

As mentioned previously, cross-linking agents such as polyalkoxysilanes of the formula $(R''' O)_z Si(R'')_{4-z}$ or polyalkoxysiloxanes in which the silicon atoms are linked through Si—O—Si and the remaining valences of the silicon atom are satisfied by $R'''$ O and/or $R''''$ are added to a composition comprising an organopolysiloxane and the tin catalyst.

In the above formula, the groups represented by $R'''$ are monovalent hydrocarbon radicals having less than eight carbon atoms, while those represented by $R''''$ are monovalent hydrocarbon radicals or halogenated hydrocarbon radicals of less than eight carbon atoms and $z$ has a value of from 3 to 4. Examples of monovalent hydrocarbon radicals represented by $R'''$ are methyl, ethyl, propyl, butyl, hexyl, octyl, phenyl, vinyl, ally, ethylallyl, butadienyl and the like. Radicals represented by $R''''$ may be the same as the radicals represented by $R'''$ above as well as the corresponding halogenated groups such as chloromethyl, 2-bromo-4,6-diiodophenyl, 1,2-difluorovinyl, 3,4-difluorocyclopentyl, 2-bromocyclopentene-2,3-yl and 6-chlorohexyl. The polyalkoxysilanes employed herein include mono-organo-trihydrocarbonoxy silanes, tetrahydrocarbonoxy silanes, e.g., ortho silicates and partial hydrolyzates of such silanes. The polyalkoxy compounds, e.g., ethyl orthosilicate or partial hydrolyzed ethyl silicate such as ethyl silicate "40" which consists primarily of decaethyl tetrasilicate are representative of these compounds. Examples of other operative alkyl silicates are ethyltrimethoxysilane, methylbutoxydiethoxysilane, propyltripropoxysilane, methyltriethoxysilane, ethyltriethoxysilane, ethyl orthosilicate and n-butyl orthosilicate. Examples of alkylpolysilicates are ethylpolysilicate, isopropylpolysilicate and butylpolysilicate, dimethyltetraethoxydisiloxane, trimethylpentabutoxytrisiloxane and the like.

The polyalkoxysilanes and polyalkoxysiloxanes employed herein may be used either alone or in combination and should be used in a proportion of from about 0.5 to about 10 percent, preferably from about 1 to 5 percent by weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced. However, a large excess of cross-linking agent insures complete reaction with all silicon bonded hydroxyl groups and in addition, acts as a scavenger for any moisture which may be present.

The curing of these organopolysiloxane compositions is brought about by mixing the hydroxyl-terminated polysiloxanes with the polyalkoxysilanes or polyalkoxysiloxanes in the presence of the organotin catalysts of this invention. These catalysts may be dispersed in an inert solvent and then added to the polysiloxane or they may be dispersed on a filler and thereafter milled with the organopolysiloxane. Examples of suitable hydrocarbon solvents are benzene, toluene, xylene and the like; halogenated hydrocarbons such as perchloroethxlene or chlorobenzene; organic ethers such as diethyl ether, dibutyl ether and the like or fluid hydroxyl-free polysiloxanes. It is preferred that the solvents be of sufficient volatility to vaporize off at a very low temperature.

The organopolysiloxanes may be compounded in the usual manner for preparing conventional siloxane elastomers. However, where the materials are stored prior to use, it is essential that the organotin catalyst or cross-linking agent such as the polyalkoxysilane or polyalkoxysiloxane be stored separately. In other words, the hydroxyl-terminated polysiloxanes, filler and cross-linking agent may be compounded and the catalyst added just prior to use. In another method, the polysiloxane, filler and catalyst may be compounded and then the cross-linking agent added just prior to use. If an inert filler is used, it may be added either to the hydroxyl-terminated organopolysiloxane or the cross-linking agent prior to the addition of the catalyst or immediately after the reactants have been combined.

The composition cures spontaneously at room temperature upon mixing the ingredients, i.e., the organopolysiloxane, catalyst, cross-linking agent and filler, if desired.

The tin compounds used in these curing systems are effective in minimal amounts, e.g., from about 0.05 to about 2.0 parts by weight, preferably from about 0.1 to about 1.0 parts by weight per 100 parts composition. A mixture of two or more of the above organotin compounds may be used as catalysts, if desired. As mentioned previously, these tin compounds may be added to the organopolysiloxane or, for convenience, they may be first incorporated in a carrier such as a liquid or a comminuted solid or they may be added to both solid and liquid components. Generally, the carrier is inert, but it may be functional.

The amount of catalyst added to the base composition is determined by the requirements of the particular job, especially the pot life or working time required. In caulking, for example, the working time is more or less conveniently calculated as of the order of from 1 to 2 hours. Thus, in this instance, the catalyst is added in an amount which will not result in any substantial stiffening of the silicone composition until after expiration of such period of time. Normally the composition is tack-free within 2 to 4 hours following the caulking operation and is substantially cured after about 24 hours and completely cured after about 7 days. These periods, of course, vary somewhat with change in humidity and temperature conditions. Thus, a faster cure results under conditions of high temperature and high humidity.

Although it is not essential, oftentimes it is preferred that fillers be incorporated in these compositions in order to impart desirable physical properties. Examples of suitable fillers are: fumed silicas, high surface area precipitated silicas, silica aerogels; as well as coarser silicas such as diatomaceous earth, crushed quartz and the like. Other fillers which may be used are metallic oxides such as titanium oxide, ferric oxide, zinc oxide and fibrous fillers such as asbestos, fibrous glass and the like. Other additives such as pigments, antioxidants, ultraviolet absorbents and the like may be included in these compositions.

Even though the particle size of the filler and additive is not critical, it is preferred that they range from about 0.14 millimicrons up to about 2 millimicrons in diameter. Particles of larger diameter may be used; however, they may be more difficult to incorporate in the composition.

By using the organotin catalysts of this invention, the time for acquiring a tack-free surface, which is an acceptable measure of cure time, may be reduced from several hours to a few minutes, depending upon the type and concentration of catalyst.

In addition to reducing the tack-free time, these catalysts also accelerate curing of the entire exposed section. Thus, a complete cure, which generally takes from 3 to 7 days without a catalyst, may be affected in as little as about 36 hours with the catalyst described herein when applied in the right concentration. The use of these catalyst in one- and two-component systems, such as described above, is as previously noted, without precedent in the art.

The compositions described herein have many applications. One of the applications for which they can be used is in connection with dental impressions. Other applications are sealants between adjacent sections of highways, insulation material for electrical components, gasket materials, adhesives and the like.

Various embodiments of this invention are further illustrated in the following examples in which all parts are by weight unless otherwise specified.

Preparation of Organotin Compounds

EXAMPLE 1

Approximately 62 parts of dibutyltin dichloride in about 500 parts of anhydrous diethyl ether are mixed with about 62 parts of triethylamine in about 200 parts of absolute ethanol and refluxed for about 0.5 hours. The mixture is cooled and filtered to remove the triethylamine hydrochloride. The alcohol is removed under vacuum, yielding a solid material having a melting point between about 111° C. to about 113° C. The product is recrystallized from dimethyl ketone and identified as $[(C_4H_9)_2SnCl]_2O$.

EXAMPLE 2

Approximately 150 parts of dibutyltin dichloride dissolved in about 300 parts of methanol are diluted with a large volume of water and refluxed for about 20 minutes. The methanol is removed under vacuum and the product is slurried in water. The residue is then filtered and dried in a vacuum. A solid material having a melting point between about 105° and 170° C. is identified as $(C_4H_9)_2Sn(OH)Cl$.

EXAMPLE 3

Approximately 434 parts of tributyltin chloride are dissolved in about 1,000 parts of ethanol and refluxed with about 150 parts of 50 percent sodium hydroxide for about 4 hours. The ethanol is removed by distillation and the residue filtered. The filtrate is fractionally distilled to yield a fraction boiling between about 220° and 230° C. The fraction is analyzed and identified as bis(tributyltin)oxide.

EXAMPLE 4

Approximately 11.5 parts of triethylamine in about 75 parts of absolute ethanol are added to about 30.4 parts of diamyltin dichloride in about 200 parts of absolute ethanol over a period of about 15 seconds with vigorous agitation. The reaction is slightly exothermic and the temperature rises to about 35° C. After about one minute, a white solid begins to form. The stirring is continued for about 1 hour, then the ethanol is distilled off at room temperature under reduced pressure. About 250 parts of anhydrous diethyl ether is added, dissolving a portion of the white solid. The residual solid is filtered off and recrystallized from acetone. The product is identified as bis(diamylchlorotin)oxide.

EXAMPLE 5

A solution consisting of about 60 parts of sodium hydroxide in about 255 parts of water is introduced into a 2 liter reactor and heated to about 90° – 95° C. About 411 parts of tri-n-propyltin chloride are added over a period of about 15 minutes with vigorous agitation. After stirring and heating for about 4 hours, the mixture is cooled and filtered. The filtrate is fractionally distilled, yielding a fraction which is identified as bis(tri-n-propyltin)oxide.

EXAMPLE 6

A mixture consisting of about 36.6 parts of diphenyltin dichloride in about 300 parts of ethanol and about 50 parts of triethylamine are heated to a temperature of 80° C. with agitation for about 1 hour. The ethanol is distilled off under reduced pressure. About 250 parts of anhydrous diethyl ether is added, dissolving a portion of the white solid. The residual solid is filtered off and recrystallized from acetone. The product is identified as bis(diphenylchlorotin)oxide.

EXAMPLE 7

A slurry consisting of about 106 parts of sodium carbonate and about 9 parts of water is added to about 630 parts of dibutyltin dilaurate dissolved in about 500 parts of dioxane and heated to reflux temperature. After refluxing for about 1 hour, the reaction mixture is cooled and filtered. The filtrate is heated under a vacuum (20 mm. Hg) to remove the dioxane. The product is identified as dibutylhydroxyl lauratostannane.

The dibutylhydroxyl lauratostannane prepared above is heated under reduced pressure in a vacuum desiccator using phosphorus pentoxide as the drying agent for a period of about 5 hours. The product is identified as bis(dibutyltin laurato)oxide.

EXAMPLE 8

In accordance with the procedure described in Example 7, a dibutyltin distearate is substituted for the dibutyltin dilaurate. The product is identified as bis(dibutyltin stearato)oxide.

EXAMPLE 9

In accordance with the procedure described in Example 7, a diphenyltin dilaurate is substituted for the dibutyltin dilaurate. The product is identified as bis(diphenyltin laurato)oxide.

EXAMPLE 10

A solution consisting of approximately 21 parts of tribenzyltin chloride in about 500 parts of ether is refluxed for approximately 4 hours with a solution consisting of about 50 parts of sodium hydroxide in about 250 parts of water. The ethyl ether is removed by distillation and the residue filtered. A product is recovered which is identified as bis(tribenzyltin)oxide.

EXAMPLE 11

A solution consisting of approximately 23 parts of tris(2-phenylethyl)tin chloride in about 500 parts of ether is refluxed for approximately 4 hours with a solution consisting of about 50 parts of sodium hydroxide in about 300 parts of water. A product is recovered which is identified as bis(2-phenylethyltin)oxide.

EXAMPLE 12

A slurry consisting of about 135 parts of sodium carbonate and about 12 parts of water is added to about 810 parts of dibutyltindipalmitate dissolved in about 1,000 parts of dioxane and heated to reflux temperature. After refluxing for about 2 hours, the reaction mixture is cooled and filtered. The filtrate is heated under vacuum (20 mm. Hg) to remove the dioxane. The product is identified as dibutyl hydroxyl palmitatostannane.

The dibutyl hydroxyl palmitatostannane prepared above is heated under reduced pressure in a vacuum desiccator using phosphorus pentoxide as the drying agent for a period of about 5 hours. The product is identified as bis(dibutyltin palmitato)oxide.

EXAMPLE 13

To about 100 parts of a hydroxyl-terminated dimethylpolysiloxane fluid having a viscosity of about 2,000 cs. are added about 5 parts of ethyl orthosilicate and about 77 parts of iron oxide. The mixture is heated to a temperature of about 275° C. with agitation and then cooled to room temperature.

To about 100 parts of this mixture is added about 0.1 part of bis(dibutyltin laurato)oxide and mixed on a three-roll mill for about 3 minutes. The mixture is then poured into a mold and cured at room temperature. After about 27 minutes, the composition is tack-free and after about 24 hours it is completely cured.

EXAMPLE 14

In accordance with the procedure described in Example 13, approximately 0.1 part of the catalyst prepared in accordance with the procedure described in Example 1 is substituted for the bis(dibutyltin laurato)oxide. The composition is tack-free after about 35 minutes.

EXAMPLE 15

In accordance with the procedure described in Example 13, approximately 0.1 part of the catalyst prepared in accordance with the procedure described in Example 2 is substituted for the bis(dibutyltin laurato)oxide. The composition is tack-free after about 24 minutes.

EXAMPLE 16

In accordance with the procedure described in Example 13, approximately 0.1 part of the catalyst prepared in accordance with the procedure described in Example 4 is substituted for the bis(dibutyltin laurato)oxide. The composition is tack-free after about 70 minutes.

EXAMPLE 17

In accordance with the procedure described in Example 13, approximately 0.1 part of the catalyst prepared in accordance with the procedure described in Example 9 is substituted for the bis(dibutyltin laurato)oxide. The composition is tack-free after about 25 minutes.

EXAMPLE 18

In accordance with the procedure described in Example 13, approximately 0.15 parts of the catalyst prepared in accordance with the procedure described in Example 10 is substituted for the bis(dibutyltin laurato)oxide. The composition is tack-free after about 20 minutes.

EXAMPLE 19

To about 100 parts of a hydroxyl end-blocked dimethylpolysiloxane having a viscosity of about 2,500 cs. at 25° C. are added about 5 parts of a polyvinyltriethoxysilane having a viscosity of about 2,000 cs. at 25° C. and about 0.3 parts of the tin compound prepared in accordance with the procedure described in Example 1. The mixture is then transferred to a mold and cured at room temperature. After about 15 minutes, the composition is tack-free and after about 24 is cured to a tough elastomer.

EXAMPLE 20

In accordance with the procedure described in Example 17, methyltriacetoxysilane is substituted for the polyvinyltriethoxysilane. The mixture cured to a tack-free condition in about 10 minutes.

EXAMPLE 21

To about 100 parts of a hydroxyl-terminated dimethylpolysiloxane fluid having a viscosity of about 1,500 cs. are added about 5 parts of ethyl orthosilicate and about 77 parts of iron oxide. The mixture is heated to a temperature of about 275° C. with agitation and then cooled to room temperature.

To each of about 100 parts of this mixture, are added various proportions of catalysts and mixed on a three-roll mill for about 3 minutes. The composition is then poured into a mold and cured at room temperature.

The following table compares the curing rates of the tin catalysts of this invention with those known in the art. In addition, the table also illustrates the effect of concentration on the curing rates of the respective catalysts.

TABLE I.—CURING RATES VERSUS CONCENTRATION

| Curing agents | Concentration of curing agents (parts) | | | | | |
|---|---|---|---|---|---|---|
| | 0.05 | 0.10 | 0.30 | 0.50 | 0.75 | 1.00 |
| Bis(dimethyltin oleato)oxide time (hr.) | | 1.0 | 0.5 | 0.2 | 0.2 | 0.2 | 0.1 |
| Bis(dibutyltin laurato)oxide time (hr.) | 10.1 | 1.0 | 0.5 | 0.4 | 0.3 | 0.3 |
| Dibutyltin dilaurate, time (hr.) | 4.7 | 3.0 | 2.6 | 1.8 | 1.4 | 1.1 |
| Dibutyltin butoxychloride, time (hr.) | 8.6 | 2.9 | 2.3 | 2.1 | 1.7 | 1.5 |

When the above examples are repeated utilizing other hydroxyl-terminated organopolysiloxanes in the presence of other tin catalysts enumerated herein, compositions are obtained which have substantially the same cure rates.

Although specific examples of the invention have been herein described, it is not intended to limit the invention solely thereto but to include all the variations and modifications falling within the spirit and scope of the appended claims.

The invention claimed is:

1. A composition capable of curing to an elastomeric solid at room temperature when exposed to atmospheric moisture which comprises an organopolysiloxane of the formula

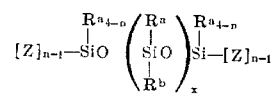

and an organotin compound of the formula

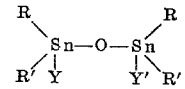

wherein $R^a$ and $R^b$ are radicals selected from the group consisting of alkyl having from one to 18 carbon atoms, aryl, alkaryl, aralkyl, alkenyl, haloaryl radicals and cyanoalkyl radicals, Z is a radical hydrolyzable by ambient moisture selected from the class consisting of monoacyloxy radicals, hydrocarbonoxy radicals, aminooxy radicals, and oxime radicals, $n$ is a number of from 2 to 4 and $x$ is a number of from 1 to 20,000, Y and Y' are selected from the group consisting of hydrocarbon, hydroxyl, halogen, OOCR" and OR and R, R' and R" are hydrocarbon groups having from one to 18 carbon atoms.

2. The composition of claim 1 wherein R and R' are alkyl radicals.

3. The composition of claim 1 wherein Y and Y' are OOCR".

4. The composition of claim 1 wherein Y and Y" are halogen.

5. A composition capable of curing to an elastomeric solid, said composition obtained from a mixture of ingredients comprising an organopolysiloxane of the formula

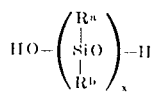

and an organotin compound of the formula

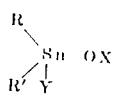

in which X is selected from the group consisting of hydrogen and

wherein $R^a$ and $R^b$ are radicals selected from the group consisting of alkyl having from one to 18 carbon atoms, aryl, alkaryl, aralkyl, alkenyl, haloaryl radicals and cyanoalkyl radicals and $x$ is a number of from 1 to 20,000, and Y and Y' are selected from the group consisting of hydrocarbon, hydroxyl, halogen, OOCR'' and OR and R, R' and R'' are hydrocarbon groups having from one to 18 carbon atoms, and further contains a cross-linking agent selected from the group consisting of polyalkoxysiloxanes in which the silicon atoms are linked through Si-O-Si linkages and polyalkoxysilanes of the formula $$(R'''O)_zSi(R'''')_{4-z}$$

in which R''' is a monovalent hydrocarbon radical having less than eight carbon atoms and R'''' is selected from the group consisting of monovalent hydrocarbon radicals and halogenated monovalent hydrocarbon radicals of less than eight carbon atoms and $z$ has a value of from 3 to 4.

6. The composition of claim 5 wherein $R^a$ and $R^b$ are alkyl groups.

7. A method for curing a composition to an elastomeric solid at room temperature which comprises mixing in an anhydrous condition an organopolysiloxane of the formula

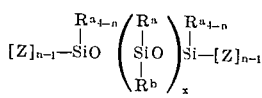

and an organotin compound of the formula

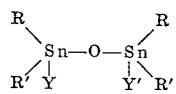

$R^a$ and $R^b$ are radicals selected from the group consisting of alkyl having from one to 18 carbon atoms, aryl, alkaryl, aralkyl, alkenyl, haloaryl radicals and cyanoalkyl radicals, Z is a radical hydrolyzable by ambient moisture selected from the class consisting of monoacyloxy radicals, hydrocarbonoxy radicals, aminooxy radicals and oxime radicals, $n$ is a number of from 2 to 4 and $x$ is a number of from 1 to 20,000, Y and Y' are selected from the group consisting of hydrocarbon, hydroxyl, halogen, OOCR'' and OR and R, R' and R'' are hydrocarbon groups having from one to 18 carbon atoms and thereafter exposing the composition to atmospheric moisture.

8. A method for preparing a composition which is capable of curing to an elastomeric solid, which comprises mixing an organopolysiloxane of the formula

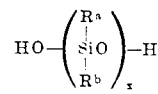

and an organotin compound of the formula

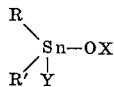

in which X is selected from the group consisting of hydrogen and

wherein $R^a$ and $R^b$ are radicals selected from the group consisting of alkyl having from one to 18 carbon atoms, aryl, alkaryl, aralkyl, alkenyl, haloaryl radicals and cyanoalkyl radicals and $x$ is an integer of from 1 to 20,000, Y and Y' are selected from the group consisting of hydrocarbon, hydroxyl, halogen, OOCR'' and OR and R, R' and R'' are hydrocarbon groups having from one to 18 carbon atoms and further contains a cross-linking agent selected from the group consisting of polyalkoxysiloxanes in which the silicon atoms are linked through Si—O—Si linkages and polyalkoxysilanes of the formula $$(R'''O)_zSi(R'''')_{4-z}$$

in which R''' is a monovalent hydrocarbon radical having less than eight carbon atoms and R'''' is selected from the groups consisting of monovalent hydrocarbon radicals and halogenated monovalent hydrocarbon radicals of less than eight carbon atoms and $z$ has a value of from 3 to 4.

* * * * *